Figure 1:
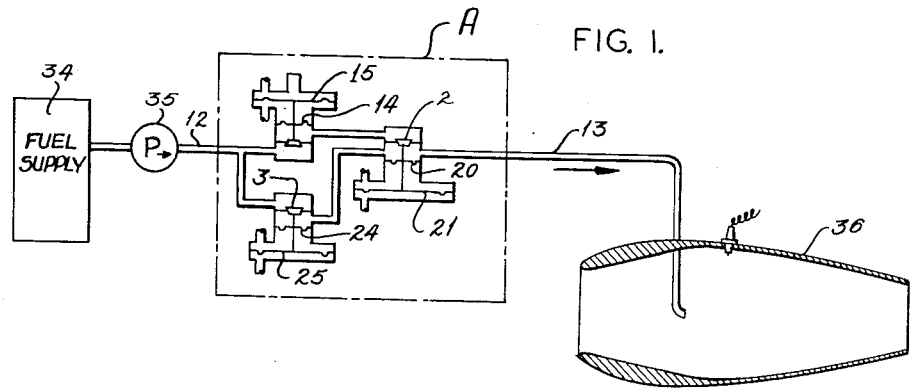

Oct. 13, 1953  H. H. OSTROFF  2,654,995
MAXIMUM-MINIMUM FUEL FLOW REGULATOR RESPONSIVE
TO RAM JET ENGINE RAM PRESSURE
Filed Nov. 1, 1947  2 Sheets-Sheet 1

INVENTOR:
Harold H. Ostroff,
by Can Van Gravely,
HIS ATTORNEYS.

Oct. 13, 1953
H. H. OSTROFF
2,654,995
MAXIMUM-MINIMUM FUEL FLOW REGULATOR RESPONSIVE
TO RAM JET ENGINE RAM PRESSURE
Filed Nov. 1, 1947
2 Sheets-Sheet 2
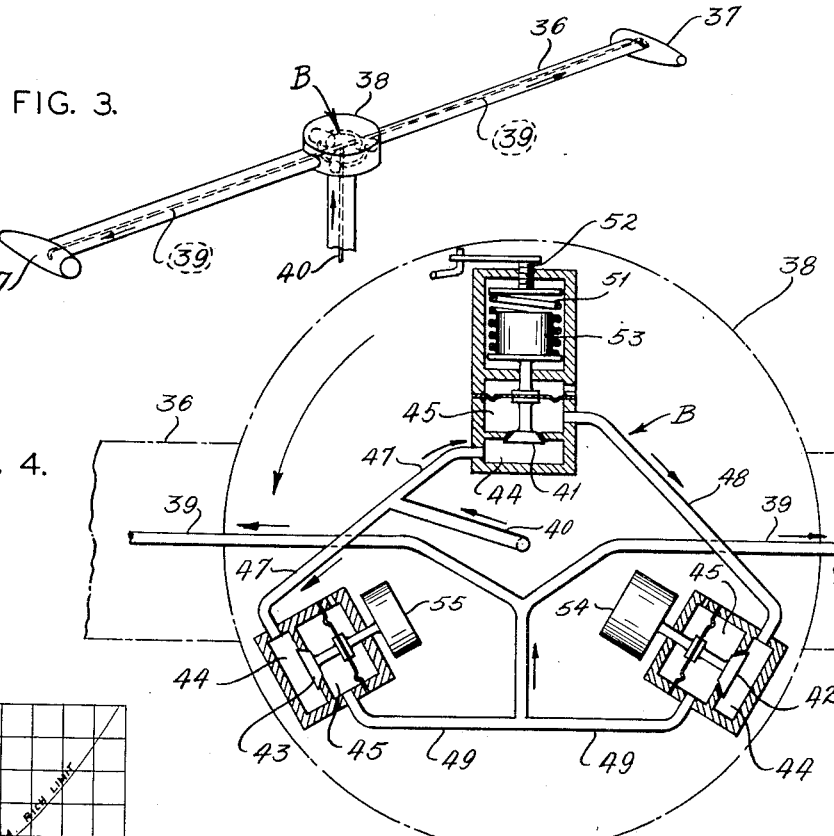
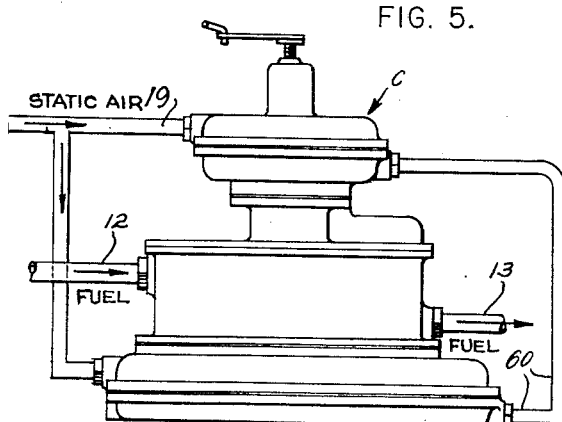
INVENTOR:
Harold H. Ostroff,
by Carr Van Gravely,
HIS ATTORNEYS.

Patented Oct. 13, 1953

2,654,995

UNITED STATES PATENT OFFICE 2,654,995

MAXIMUM-MINIMUM FUEL FLOW REGULATOR RESPONSIVE TO RAM JET ENGINE RAM PRESSURE

Harold H. Ostroff, Ferguson, Mo., assignor to McDonnell Aircraft Corporation, St. Louis, Mo., a corporation of Maryland Application November 1, 1947, Serial No. 783,581

8 Claims. (Cl. 60—39.28)

1

This invention relates to fuel regulators for internal combustion engines, particularly ram jet propulsion engines for aircraft.

Heretofore such fuel regulators have been provided with a fuel flow control means that is manually adjustable and is responsive to the fuel pressure, ram air pressure (air speed) and static air pressure (altitude) to automatically vary, throughout the specified operating range of the engine, the proportion of air and fuel forming the combustible fuel-air mixture supplied to and burned within said engine. Under certain operating conditions, however, such fuel regulators may produce an excessively rich or an excessively lean fuel-air mixture. With either of these mixtures, combustion may cease and reignition is difficult and the resulting loss of thrust may endanger the aircraft. Other objections to an excessively rich fuel mixture are resonating and overheating of the engine.

The principal object of the present invention is to provide a fuel regulator of the above type which will automatically maintain the proportion of air and fuel within predetermined rich and lean ratio limits under all operating conditions of the engine and throughout the entire speed range thereof. Another object is to provide for manually adjusting the regulator to maintain a predetermined fuel flow at a given static air pressure and ram air pressure. Another object is to provide for automatically adjusting the fuel flow in response to air speed and altitude without increasing or decreasing the fuel-air ratio beyond predetermined maximum rich and minimum lean limits. Another object is to render the fuel flow proportional to air speed, by means such as ram air pressure, or the combination of centrifugal forces and air or fluid pressure. Another object is to provide means responsive to the fuel pressure, velocity and static air pressure tending to maintain the aircraft at a preselected indicated air speed while preventing an increase or decrease of the fuel-air beyond predetermined maximum rich and minimum lean limits at such preselected air speed. Another object is to provide a fuel regulator which will control the fuel to a multiple jet engine aircraft so that when one or more engines become inoperative, the fuel flow of the remaining engine or engines will be increased to maintain the selected air speed, but with control over the maximum rich limit, as above set forth.

The invention consists in the fuel regulator and in the parts and arrangements and combinations of parts hereinafter described and claimed.

2

Figure 2:
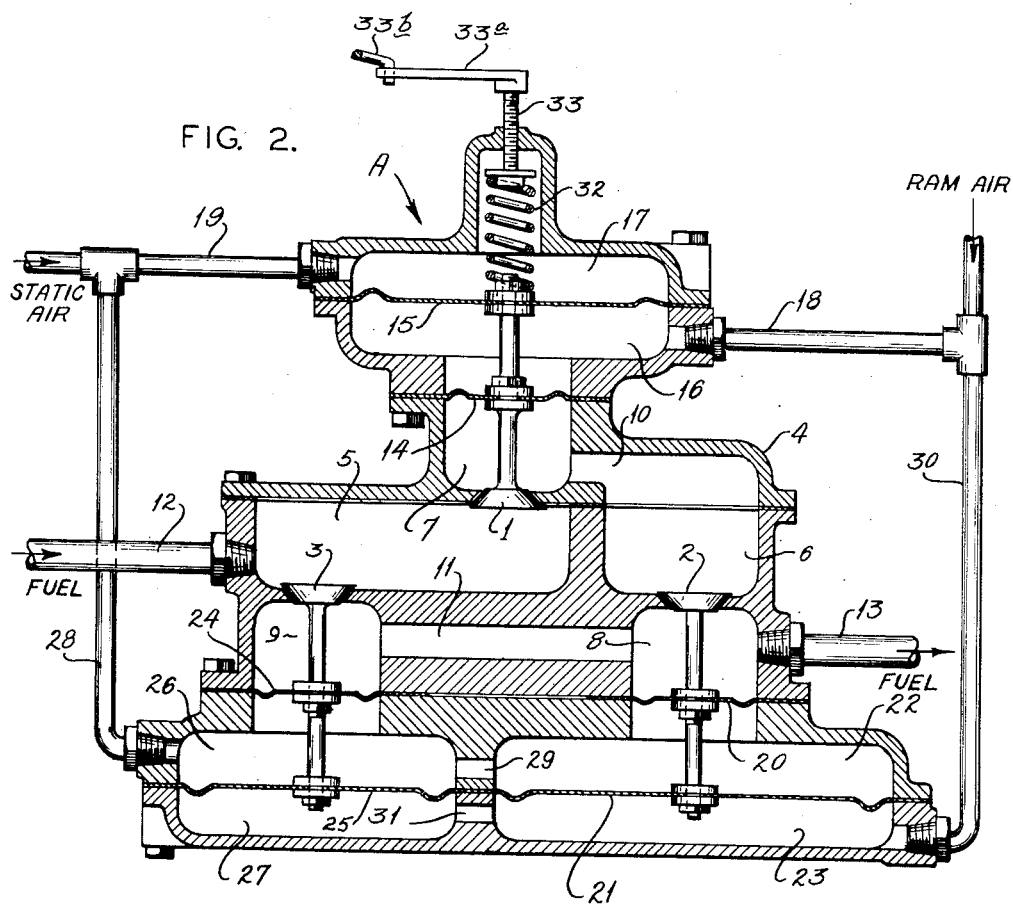

In the accompanying drawings, which form part of this specification and wherein like symbols refer to like parts wherever they occur, Fig. 1 is a diagrammatic view showing a fuel regulator embodying my invention incorporated in the fuel supply system of a ram jet engine, Fig. 2 is a cross-sectional view of the fuel regulator shown in Fig. 1, Fig. 3 is a perspective view of a jet actuated helicopter rotor having a fuel regulator embodying my invention mounted in the hub thereof, Fig. 4 is a horizontal sectional view of the hub portion of the rotor shown in Fig. 3, Fig. 5 is a sectional-elevational view, showing the fuel regulator of Figs. 1 and 2 provided with a pressure bellows for operating the valves of the said regulator and a centrifugal speed responsive device for operating said bellows; and Fig. 6 is a curve sheet showing the relation between air speed and fuel flow illustrating the maximum rich and minimum lean limits of fuel-air flow.

The fuel flow regulator A shown in Figs. 1 and 2 of the accompanying drawings includes a main fuel valve 1, a maximum fuel flow valve 2 and a minimum fuel flow valve 3. All of said valves may be of the poppet valve type and are actuated to control the fuel flow therethrough by diaphragms or bellows associated therewith and acted upon by a velocity responsive means such as ram air pressure, static air pressure and fuel pressure, the main fuel valve 1 having an additional actuating means inculding a manually adjustable spring hereinafter more fully described.

The valves 1, 2, and 3 are illustrated as being enclosed in a composite housing 4 having a fuel inlet chamber 5 common to valves 1 and 3, a fuel inlet chamber 6 for valve 2 and fuel pressure or outlet chambers 7, 8 and 9 for valves 1, 2 and 3, respectively. Chambers 6 and 7 are connected by a port 10 while a passage 11 joins chambers 8 and 9. Fuel is admitted to chamber 5 through conduit 12 from a suitable source of supply and exits through conduit 13 from chamber 8 to an associated engine.

Secured to the shank portion of valve 1 and housing 4 are diaphragms 14 and 15 serving to divide the housing surrounding valve 1 into the fuel pressure chamber 7, a ram air chamber 16 and a static air chamber 17, ram and static air pressures being introduced to their respective chambers by conduits 18 and 19. Similarly, diaphragms 20 and 21 are provided for valve 2 to divide its housing portion into the fuel pressure chamber 8, a static air chamber 22 and a ram air chamber 23; and diaphragms 24 and 25 are secured to valve 3 to divide its housing portion into the fuel pressure chamber 9, a static air chamber 26 and a ram air chamber 27. Static air pressure is introduced to chambers 26 and 22 through conduit 28 and an interconnecting port 29; similarly, ram air pressure is introduced to chambers 23 and 27 through conduit 30 and interconnecting passage 31.

The above mentioned additional actuating means for valve 1 comprises a compression spring 32 having one end thereof bearing against the shank of valve 1 urging said valve toward open position. The opposite end of spring 32 is seated against an enlarged end of a threaded adjusting screw 33, the threads of which engage a threaded opening in housing 4 so that rotation of the screw will adjust the spring pressure acting on the valve for any desired fuel metering characteristics of valve 1. Rotation of screw 33 may be accomplished by means of a lever 33a attached to the extending end of screw 33 and a control rod 33b for actuation by a manual or pilot control system, or for automatic actuation by suitable remote controlled means such as used for control of pilotless aircraft or guided missiles.

One application of the fuel regulator A to the fuel system of a jet engine is illustrated diagrammatically in Fig. 1. The inlet conduit 12 is connected to a fuel supply tank 34 with a pump 35 installed in the line 12 to supply fuel to the regulator A under any desired pressure. Fuel outlet conduit 13 leads directly from regulator A to an associated ram jet engine 36.

Assuming the fuel regulator A to be installed in the fuel system of a ram jet engine used to propel an airplane, guided missile or other jet propelled device, with the regulator receiving ram air in pressures approximately proportional to those imposed on the engine, the operation of the novel regulator A is as follows:

Unregulated fuel under pressure enters chamber 5 from conduit 12 and, since valve 1 is normally held in open position by spring 32, is metered by valve 1 as it passes into fuel pressure chamber 7 thence through valve 2 to engine 36. The valve opening and thus the amount of fuel flow therethrough is controlled by the balance between the metered fuel pressure in chamber 7 acting on diaphragm 14 exerting a valve closing force, and spring 32 which exerts a valve opening force. The valve opening force of spring 32 may be varied by manual or mechanical rotation of the adjusting screw 33 to change the fuel pressure regulating characteristics of valve 1. The basic fuel pressure, as determined by the above described balance between metered fuel pressure and spring force, is modified by static air pressure in chamber 17 and ram air pressure in chamber 16 acting on diaphragm 15. Thus, assuming the spring 32 to be adjusted to maintain a predetermined fuel flow through valve 1 at a given static air pressure and ram air pressure, an increase in air speed of the aircraft, and thus ram air pressure, will tend to close valve 1 by the resulting forces exerted on diaphragm 15. Such closing movement of valve 1 will reduce the flow of fuel to the engine 36 reducing its thrust and thus reducing the speed of the aircraft until the original equilibrium of forces within the regulator is again established. Conversely, a decrease in air speed, and thus ram air pressure, will lessen the ram air pressure on diaphragm 15 against pressure of spring 32 and allow the spring to further open valve 1 to increase the flow of fuel to the engine increasing its thrust and thus raising the speed of the aircraft.

As previously pointed out, if the fuel-air mixture in a ram jet engine becomes too rich, resulting from an excessive fuel flow thereto, burning may no longer be sustained in the engine combustion chamber and other undesirable results may be encountered such as resonating and overheating. With a fuel regulator comprising only the valve 1 it is possible to supply an excessive amount of fuel to the engine under certain conditions, one such condition may be found in an excessive climbing attitude of the aircraft which decreases the air speed and thus the ram air pressure to the extent that lack of sufficient pressure on diaphragm 15 will allow spring 32 to open valve 1 for excessive fuel flow.

To eliminate the above objectionable conditions resulting from excessive fuel flow, valve means 2 is provided in the fuel system between valve 1 and the engine to limit the fuel flow to the engine to a predetermined maximum fuel flow without affecting the operation of valve 1. Ram air enters chamber 23 through conduit 30 and exerts a valve opening force on valve 2 so that, normally, valve 2 is fully open to allow free fuel flow from valve 1, chamber 7, port 10, inlet chamber 6, pressure chamber 8 and conduit 13 to the engine 36. Static air is admitted to chamber 22 from inlet conduit 28, chamber 26 and port 29. As mentioned above, under normal aircraft operation, valve 2 remains fully open for unrestricted fuel flow therethrough, however, when the ram air pressure decreases below a predetermined value, lack of sufficient pressure in chamber 23 will allow fuel pressure in chamber 8 acting on diaphragm 20 and static air pressure in chamber 22 acting on diaphragm 21 to move the valve 2 toward closed position. However, the areas of diaphragms 20 and 21 are so related that for any given air speed, and thus ram air pressure, the fuel flow through valve 2 will be restricted to an amount no greater than that desired for a predetermined maximum rich fuel-air mixture in the engine. Thus it will be seen that, regardless of any excess of fuel flow allowed through valve 1, fuel flow will be limited to a predetermined maximum by valve 2 thus eliminating the undesirable resonating and overheating of the engine, and endangering the aircraft by cessation of engine operation. During the above described cycle of operation, valve 3 remains closed or inoperative so that fuel flow is controlled solely by valves 1 and 2.

As previously pointed out, if the fuel-air mixture of a ram jet engine becomes too lean, combustion may cease in the engine and reignition becomes difficult under most operation conditions. Therefore, it is highly desirable that means be provided in the fuel system which will assure a predetermined minimum fuel flow in proportion to air speed to the engine to maintain operation thereof regardless of the fuel requirements indicated by the normal control means. The above mentioned too lean fuel-air mixture may result from an excessive diving attitude of an aircraft which increases the air speed, and thus the ram air pressure, to the extent that the increased ram air pressure on diaphragm 15 will move valve 1 toward a closed position or to the point where insufficient fuel is supplied to the engine to maintain a minimum lean fuel-air mixture.

To eliminate this objectionable condition of sub-minimum fuel flow, valve 3 is provided in the fuel system which assures a predetermined minimum fuel flow in proportion to air speed for assured engine operation regardless of below minimum fuel flow conditions of valve 1. Similarly to valves 1 and 2 fuel flow through valve 3 is determined by interaction of fuel pressure, static air pressure and ram air pressure on diaphragms 24 and 25. The relation of parts and diaphragm areas of valve 3 are so related that the valve is normally in fully closed position so that normal fuel flow through the regulator is through valves 1 and 2. When an excessively high air speed is reached by the aircraft as may be encountered in a steep diving attitude the high ram air pressure will act on diaphragm 15 of valve 1 to move the valve toward closed position, thus reducing the fuel flow to the engine below a predetermined minimum lean fuel-air mixture. When such condition prevails the ram air pressure will have reached a magnitude sufficient to open valve 3 for fuel flow therethrough. The ram air is admitted to chamber 27 of valve 3 through conduit 30, chamber 23 and passage 31 while static air is admitted to chamber 26 through conduit 28. Upon the opening of valve 3 fuel flow takes place from chamber 5 through valve 3, pressure chamber 9, passage 11, chamber 8 and conduit 13 to the engine. Fuel flow to the engine under the above described minimum fuel-air mixture requirement may be had through both valves 1 and 3 or through valve 3 only depending on the magnitude of ram air pressure and operating requirement of the engine.

The operation of the fuel regulator is dependent upon the relation between the areas of diaphragms 20 and 21, 24 and 25 and this relationship bears a definite ratio to the areas of diaphragms 14 and 15. When these areas are suitably and definitely proportioned, the opening and closing of the valves controlled by these diaphragms with relation to the fuel pressure and air speed at any static or atmospheric pressure condition, may be plotted to show the relationship between fuel pressure and air speed. This relationship is graphically illustrated in Fig. 6 which defines the maximum rich mixture and the minimum lean limit mixture for air and fuel at which the engine will operate. The areas between the two curves define the operating range of fuel-air mixtures for any given engine under the conditions shown by the curves.

The valves in the regulator operate as individual units, the first of which consists of a spring balanced diaphragm pressure regulator modified by a speed compensating diaphragm. Unregulated fuel under pressure enters the chamber 5 and is metered by valve 1 as it passes into chamber 7. The position of valve 1 is controlled by the balance between the force generated by the pressure of the fuel acting on diaphragm 14, tending to close the valve, and spring 32, having a suitably chosen spring rate, tending to open the valve. When the forces acting on the diaphragms are not in equilibrium, valve 1 will move in the direction necessary to adjust the pressure of the fuel in chamber 7 by an amount necessary to place the forces acting on the diaphragms in equilibrum.

The basic fuel pressure is determined by the balance between the metered fuel pressure and the spring force is modified by the speed compensating diaphragm 15 which is acted on by atmospheric pressure in chamber 17 and ram air pressure in chamber 16. Thus, for any adjustment of spring 32, a predetermined fuel pressure is establishing in chamber 7 for a given ram air pressure and with an increase in air speed, will tend to move valve 1 toward closed position, thereby lowering the pressure in chamber 7 by an amount necessary to reestablish the conditions for equilibrium of forces acting on the diaphragms actuating valve 1. This reduced fuel pressure results in reduced fuel flow, thereby slowing down the aircraft until the original equilibrium of forces within the regulator is reestablished at the initial air speed. Conversely, a decrease in air speed will cause a greater flow of fuel and tend to increase the speed of the aircraft. However, if the tension of spring 32 is varied, the forces present in the several chambers 7, 16 and 17 will be modified in proportion to the adjusted spring tension.

The valve 2 and its associated components is a pressure regulator, balancing fuel pressure against ram air pressure. If the fuel-air mixture in a ram jet engine becomes too rich, burning will no longer be sustained in the combustion chamber. Various elements enter into the operation of a specific ram jet engine to determine its characteristics which may make it desirable to establish a certain rich fuel-air mixture. This rich mixture limit varies in proportion to the ram air pressure, as illustrated in Fig. 6.

If the regulated pressure of valve 1 becomes greater than that necessary for the selected maximum fuel flow for a given ram air pressure, valve 2 will reduce the fuel pressure to the desired maximum. The diaphragms actuating valve 2 balance the ram air pressure acting on the diaphragm 21 against fuel pressure acting on diaphragm 20, thereby varying the regulated pressure delivered by this unit in proportion to the ram air pressure. The diaphragm areas are so proportioned that the regulated fuel pressure delivered by this unit for all changes in air speed and atmospheric pressure is that required for maximum rich operation of the ram jet engine. In other words, this unit is so proportioned as to regulate fuel pressure in accordance with the maximum rich schedule shown in Fig. 6. If valve 1 supplies fuel to valve 2 at a pressure less than that required for maximum rich operation, valve 2 will not be able to achieve equilibrium and valve 2 will be open and will not meter the fuel supplied by valve 1 to the ram jet engine.

The valve 3 and its associated components is a diaphragm type pressure regulator balancing fuel pressure against ram air pressure. If the fuel-air mixture in a ram jet engine becomes too lean, burning will no longer be sustained in its combustion chamber. As in the case of the rich mixture limit, this lean limit varies in proportion to ram air pressure, as shown in Fig. 6.

If the regulating pressure of unit 1 drops below that required for minimum fuel flow for a given ram air pressure, valve 3 by-passes fuel to chamber 8 and then to the ram jet engine, thereby supplying the desired minimum flow thereto. The regulating action of valve 3 is identical to that of valve 2 with the exception that the ram air and fuel diaphragms are so proportioned as to supply the minimum fuel pressure required with all changes in air speed and atmospheric pressure. The areas of diaphragms 24 and 25 are so proportioned as to cause fuel pressure regulation in accordance with the minimum lean schedule of requirements illustrated in Fig. 6. As long as the pressure being delivered by valve 1 of the ram jet engine is greater than that called for by the minimum lean schedule, valve 3 will not be able to achieve equilibrium and, therefore, will be held closed.

When the regulated pressure of fuel delivered by valve 1 is less than the rich limit as determined by valve 2 and greater than the lean limit as determined by valve 3, the following action occurs:

a. Since valve 2 is for the purpose of regulating fuel pressure to a higher value than that at which it is received, it will remain open and, therefore, will not meter fuel.

b. Since valve 3 is for the purpose of regulating fuel pressure to a lower value than that which is present in the regulated fuel chamber, it will remain closed and, therefore, inoperative.

When the regulated pressure delivered by valve 1 is greater than the rich limit as determined by valve 2, the latter reduces the pressure to the rich limit. During this operation valve 3 is inoperative.

When the regulated pressures as determined by valve 1 are less than the lean limit as determined by valve 3, the latter by-passes valves 1 and 2 and supplies the required minimum fuel flow. This pressure is effective in chambers 8 and 6 because valve 2 is open and closes valve 1 which is set to a lower pressure.

From the above description of the present novel fuel regulator and its operation it will be seen that fuel flow to an associated engine will be controlled within the desired operating range and limited by the definite predetermined maximum rich and minimum lean fuel-air mixture for the engine.

Figs. 3 and 4 illustrate another form of the improved fuel regulator as applied to ram jet-propelled propellers or helicopter rotors to act as a constant speed governor with provisions for manual selection of propeller or rotor speed and automatically maintain this speed as long as the ram jet engine can do so and remain within the predetermined rich and lean fuel-air mixture limits. This embodiment is shown as applied to propeller or rotor 36 having ram jet engines 37 secured to the outer ends thereof and a fuel regulator B positioned in the central hub 38. Fuel feed conduits 39 are provided to deliver fuel to the engines from the regulator and an inlet conduit 40 supplies fuel under pressure to the regulator from a fuel source. The fuel regulator B comprises a main fuel valve 41, a maximum flow fuel valve 42 and a minimum flow valve 43, each valve having a fuel inlet chamber 44 and a fuel pressure or outlet chamber 45. Fuel inlet conduits 47 lead from feed conduit 40 to inlet chambers 44 of valves 41 and 43, a conduit 48 connects the outlet chamber 45 of valve 41 with inlet chamber 44 of valve 42 and conduits 49 deliver fuel from outlet chambers 45 of valves 42 and 43 to feed lines 39 and thence to engines 37. A spring 51 is associated with valve 41 normally urging same to open position with a manually or mechanically operated screw means 52 for adjusting the pressure of spring 51 acting on the valve identical in purpose and operation as spring 32 and screw means 33 of valve 1 in regulator A. A means responsive to rotor speed is associated with each valve in the form of weight elements 53, 54, and 55 secured to the shank portions of valves 41, 42 and 43, respectively. Each valve is spaced outwardly from the center of rotation of rotor 36 within hub 38 so that centrifugal force resulting from rotation of the propeller or rotor 36 will cause the weights to act upon the valve in much the same manner as ram air pressure acted upon the valves of regulator A. Any change in rotor speed will result in a change in ram air pressure of jet engines 37 and will likewise affect the forces applied to valves 41, 42 and 43 by their respective weights. Therefore, valve 41 will automatically vary the fuel flow to the engines 37 in a manner similar to valve 1 of regulator A and maintain the engine at a preselected air speed and the rotor at a preselected R. P. M. as controlled by fuel pressure and the velocity responsive means or weight 53. Valve 42 will limit the maximum fuel flow to the engine in response to fuel pressure and velocity responsive means or weight 54 and valve 43 will limit the minimum fuel flow responsive to fuel pressure and velocity responsive means or weight 55. While the fuel regulator B is shown as being mounted in a rotor hub it may very well be mounted for rotation elsewhere in an airplane or helicopter providing the change in rate of rotation thereof is proportional to the change in ram air pressure of the associated engine.

Another application of the fuel regulator of this invention is shown in Fig. 5 wherein the velocity responsive means operating the several valves is a combination of air or fluid pressure and centrifugally operated weights. This form of fuel regulator C is identical in construction and operation to regulator A of Fig. 2 and is provided with fuel inlet and outlet conduits 12 and 13, respectively, and air or fluid pressure inlet lines 60. A pressure bellows 61 is connected to a rotative velocity responsive means such as a standard form of a flyweight governor 63 so that change in rate of rotation of the governor will be reflected in movement of the bellows to increase or decrease the air or fluid pressure to the several valves in fuel regulator C. It is preferred that the bellows 61 and its associated pressure lines contain an incompressible fluid so that the total bellows movement required from the governor may be held to a minimum. Governor 63 may be suitably driven through gear train 64 from any source, such as a jet propelled propeller or helicopter rotor 65, or may be driven from an air speed responsive device of a jet propelled airplane or any other means which reflects changes in rate of rotation proportional to change in ram air pressure of the ram jet engine controlled by the fuel regulator C.

In jet engine installations employing more than one jet engine, such as multi-engine jet aircraft, jet actuated propeller or helicopter rotors, failure of any one engine will, of course, decrease the total thrust and therefore the air speed unless more fuel is admitted to the remaining engine or engines. The pressure on the liquid in bellows 61 is varied directly with the rotative speed and reacts on the fuel flow control valves in the same manner as do the weights in Fig. 4 and the ram pressure in Fig. 2. The fuel regulator above described will automatically supply the additional fuel to the remaining engine but only to the predetermined maximum rich fuel air mixture thus assuring continued operation of the remaining engine at maximum thrust.

While the foregoing description and accompanying illustrations disclose valve assemblies including both maximum and minimum flow fuel valves, it is contemplated that either valve may be omitted for installations requiring fuel flow regulation to either rich or lean fuel-air mixture limits. It will be apparent that omission of either valve will not affect the operation of the remaining valve in its intended purpose.

From the foregoing description it will be seen that the fuel regulator of this invention attains the objects set forth in effectively controlling the fuel flow to a ram jet engine within predetermined rich and lean fuel-air ratio limits as determined by velocity responsive means and altitude. It is to be understood that certain changes in parts, their relationship and application of the disclosed fuel regulator may be made without departing from the spirit and intended scope of this invention as defined by the appended claims.

What I claim is:

1. A fuel regulator for jet engines comprising a main fuel valve, a maximum flow fuel valve and a minimum flow fuel valve, housing means for said valves, conduit means connecting said housing means with a source of fuel and the jet engines, and other means connected with said valves to operate the same, said other means being movable in response to ram air and atmospheric pressure for regulating the fuel flow positions of said valves between a maximum fuel flow limit as determined by said maximum flow fuel valve and a minimum fuel flow as determined by said minimum flow fuel valve.

2. A fuel regulator for ram jet engines comprising a main fuel valve, a maximum flow fuel valve and a minimum flow fuel valve, housing means for said valves, conduit means connecting said housing means with a source of fuel and the jet engines, manually operable resilient means for adjusting said main valve, and means associated with each of said valves and responsive to the interaction of ram air pressure, static air pressure and fuel pressure acting on said valves to control the fuel flow therethrough within predetermined limits of maximum fuel flow as controlled by said maximum fuel flow valve and minimum fuel flow as controlled by said minimum flow valve in all positions of manual adjustment of said main fuel valve, said minimum flow valve being operable upon the maintenance of a sufficient ram pressure on the means associated with said minimum flow valve to effect control thereof.

3. A fuel regulator for ram jet engines comprising a manually operable fuel valve, a maximum fuel flow valve and a minimum flow fuel valve, housing means for said valves, conduit means connecting said housing means with a source of fuel and the jet engines, and means associated with each of said valves and responsive to change in ram air pressure, static air pressure and fuel pressure, whereby fuel mixture control may be maintained within a maximum fuel flow predetermined by said maximum flow valve and a minimum fuel flow predetermined by said minimum flow valve irrespective of fuel flow limits imposed by said manual fuel valve, said minimum flow valve being operable upon the maintenance of a sufficient ram pressure on the means associated with said minimum flow valve to effect control thereof.

4. The combination set forth in claim 3 wherein each of said valve housing means has fuel inlet and outlet ports, the inlet port of said manually operable fuel valve communicates with the fuel source, the outlet port of said manually operable valve communicates with the inlet port of said maximum flow valve and the outlet port of said maximum flow valve communicates with an associated engine, and the inlet port of said minimum flow valve communicates with a fuel source and the outlet port thereof communicates with said engine.

5. A fuel regulator adapted to control the fuel-air mixture of a ram jet engine comprising a main fuel valve, a maximum flow fuel valve and a minimum flow fuel valve, housing means for said valves, conduit means connecting said housing means with a source of fuel and the jet engine, means associated with said maximum flow valve and responsive to ram air pressure, static air pressure and fuel pressure for limiting the fuel flow through said valve to a predetermined maximum fuel flow requirement of said engine, means associated with said minimum flow valve responsive to ram air pressure, static air pressure and fuel pressure for limiting the fuel flow through said valve to a predetermined minimum fuel flow requirement of said engine, manually actuated spring means for said main fuel valve, and means associated with said main valve and responsive to change in ram air pressure, static air pressure and fuel pressure and acting in conjunction with said manual spring means tending to control the fuel pressure through said valve irrespective of the maximum fuel flow and minimum fuel flow requirements of the associated engine.

6. A fuel regulator for ram jet engines comprising a main fuel valve, a minimum flow fuel valve and a maximum flow fuel valve, valve housing means having fuel inlet and outlet ports for each of said valves, the inlet ports of said main valve and said minimum flow valve being connected to a fuel source, the outlet port of said main valve being connected to the inlet port of said maximum flow valve, and the outlet ports of said minimum flow valve and said maximum flow valve being connected to an associated jet engine, resilient means associated with said main valve urging said valve toward open position, a manual adjustment for said resilient means, means acting on said main fuel valve in conjunction with said resilient means and responsive to ram air pressure, static air pressure and fuel pressure for controlling the fuel flow through said main valve to said maximum flow valve and to said engine, means acting on said maximum flow valve and responsive to ram air pressure, static air pressure and fuel pressure to limit the fuel flow through said maximum flow valve to the jet engine to a predetermined maximum fuel flow regardless of fuel flow limits through said main fuel valve, and means acting on said minimum flow fuel valve and responsive to ram air pressure, static air pressure and fuel pressure for controlling the fuel flow through said minimum flow valve to the jet engine to a predetermined minimum fuel flow regardless of fuel flow limits through said main fuel valve, said minimum flow valve being operable upon the maintenance of a sufficient ram pressure on the means acting on said minimum flow valve to effect control thereof.

7. The combination set forth in claim 6 wherein said main fuel valve and said maximum flow valve are operative in a fuel passageway between a fuel source and the engine in the order set forth, and said minimum flow valve is operative in a fuel passageway between the fuel source and the engine independent of the first mentioned fuel passageway.

8. A fuel regulator for ram jet engines including a main fuel valve, a maximum flow fuel valve and a minimum flow fuel valve, housing means for said valves, conduit means connecting said housing means with a source of fuel and the jet engines, resilient means acting on said main valve urging same toward open position, means associated with said main valve responsive to ram air pressure, static air pressure and fuel pressure to actuate said valve through the range of fuel flow from fully closed position to fully open position, means associated with said maximum flow fuel valve and responsive to ram air pressure, static air pressure and fuel pressure to actuate said valve through the range of fuel flow therethrough from a normal fully open position to partially open position for a predetermined maximum fuel flow therethrough, and means associated with said minimum flow fuel valve and responsive to ram air pressure, static air pressure and fuel pressure to actuate said minimum flow fuel valve through the range of fuel flow therethrough from a normal fully closed position to a partially open position to provide a predetermined minimum fuel flow therethrough.

HAROLD H. OSTROFF.

References Cited in the file of this patent

UNITED STATES PATENTS

| Number | Name | Date |
| --- | --- | --- |
| 2,420,554 | Mott | May 13, 1947 |
| 2,440,566 | Armstrong | Apr. 27, 1948 |
| 2,446,339 | Orr | Aug. 3, 1948 |
| 2,447,267 | Mock | Aug. 17, 1948 |
| 2,488,250 | Williams | Nov. 15, 1949 |
| 2,511,213 | Leslie | June 13, 1950 |
| 2,531,780 | Mock | Nov. 28, 1950 |
| 2,545,815 | Klinge | Mar. 20, 1951 |
| 2,566,319 | Deacon | Sept. 4, 1951 |